United States Patent
Germano

(10) Patent No.: US 6,732,636 B1
(45) Date of Patent: May 11, 2004

(54) ANGEL HAIR PASTA BASKET

(76) Inventor: L. Stephen Germano, P.O. Box 219151 Dryden Rd., Apt. 627, Ithaca, NY (US) 14850

( * ) Notice: Subject to any disclaimer, the term of this patent is extended or adjusted under 35 U.S.C. 154(b) by 6 days.

(21) Appl. No.: 10/445,799

(22) Filed: May 28, 2003

(51) Int. Cl.⁷ ............................. A23L 1/00; A47J 37/00; A47J 37/12
(52) U.S. Cl. ......................... 99/411; 99/403; 99/413; 99/415; 99/418; 99/426; 99/450
(58) Field of Search ..................... 99/336, 337–340, 99/403–418, 426, 444–450; 210/DIG. 8, 464–470, 167; 211/181.1; 220/912, 751; D7/354, 409

(56) References Cited

U.S. PATENT DOCUMENTS

| | | | |
|---|---|---|---|
| 1,994,268 A | * 3/1935 | Bartels | 99/343 |
| 3,071,064 A | * 1/1963 | Horvath | 99/336 |
| 3,217,633 A | * 11/1965 | Anetsberger | 99/327 |
| 3,242,849 A | * 3/1966 | Wells | 99/411 |
| 3,525,299 A | * 8/1970 | Gouwens | 99/336 |
| 4,508,027 A | * 4/1985 | McCord | 99/416 |
| 4,735,135 A | 4/1988 | Walker | |
| D296,643 S | 7/1988 | Mueller | |
| 4,854,227 A | * 8/1989 | Koopman | 99/416 |
| 5,253,566 A | * 10/1993 | McCabe et al. | 99/403 |
| 5,385,084 A | * 1/1995 | Laibson | 99/411 |
| 5,544,567 A | * 8/1996 | Davis et al. | 99/403 |
| 5,826,494 A | * 10/1998 | Wang | 99/340 |
| 5,913,966 A | 6/1999 | Arnone et al. | |
| 5,957,038 A | 9/1999 | Shimazaki | |
| 5,992,306 A | * 11/1999 | Chiang | 99/411 |
| 6,055,901 A | 5/2000 | Gantos et al. | |
| 6,103,291 A | * 8/2000 | Fernandez Tapia | 426/523 |
| 6,176,175 B1 | 1/2001 | Moreth | |

* cited by examiner

*Primary Examiner*—Timothy F. Simone
(74) *Attorney, Agent, or Firm*—Richard C. Litman

(57) ABSTRACT

The angel hair pasta basket is a cylindrical mesh basket with a flat bottom, an ergonomic handle and three retaining clips extending downward from the outside surface of the mesh basket. The mesh is a fine mesh sized to prevent fine pasta from escaping from the basket. The flat bottom allows the basket to rest on the floor of a commercial pasta cooker basin. The handle is ergonomic and is attached to the basket at an angle such that it is easy to grasp even when the basket is almost entirely submerged within a pasta cooker basin. The retaining clips allow the basket to be suspended from the side of a stockpot or the rim of a commercial pasta cooker and, thus, allow for hands-free straining.

9 Claims, 5 Drawing Sheets

ANGEL HAIR PASTA BASKET

BACKGROUND OF THE INVENTION

1. Field of the Invention

The present invention relates to a cooking apparatus and, more particularly, to an apparatus for cooking and straining angel hair pasta that has fine mesh sidewalls to prevents fine pasta from escaping while being boiled, and has retaining clips and a flat bottom to allow the apparatus to either to hang from the side of a stock pot or rest on the bottom of a commercial gas pasta cooker.

2. Description of the Related Art

In a restaurant or other commercial cooking setting, pasta is typically prepared by placing it in a pasta basket and submerging the basket in boiling water. Typically, the boiling water is provided by a commercial gas pasta cooker, which resembles a deep fryer in a fast food restaurant. Once boiled, the pasta is then strained by holding the pasta basket above the boiling water for approximately fifteen seconds.

Two common problems are associated with cooking fine pasta, particularly angel hair pasta. First, pasta baskets or strainers used with commercial pasta cookers are not well suited for holding fine pasta. While the holes or openings in such pasta baskets are small enough to contain many types of pasta, they are too large to contain fine pastas, such as angel hair pasta. Typically, some fine pasta will escape from the pasta basket while being cooked. The escaped pasta then either travels in the boiling water to another basket, resulting in the common occurrence where a patron who has ordered one type of pasta is served small amounts of another pasta in his or her serving, or the escaped pasta simply remains in the cooker water, requiring a change of the water which, in turn, requires down-time while draining and refilling the cooker and also requires reheating time and energy while the fresh water is brought to a boil.

The second common problem associated with cooking fine pasta is that pasta baskets cannot be used in a variety of manners with a commercial pasta cooker. Pasta baskets used with pasta cookers are designed to hang from either the front or back rim of the cooker, but not to rest on the floor of the cooker basin. Thus, if both the front and back rims are completely occupied, a cook must wait for space on one of the rims to become available before cooking an additional order of pasta.

Similarly, cooking fine pasta with a stockpot presents two common problems in both commercial and home settings. Typically, pasta prepared with a stockpot is placed in a strainer that is suspended in boiling water that is contained within the pot. However, the holes or openings in stock pot strainers are not small enough to prevent fine pasta from escaping and, second, once pasta is cooked, the strainer must be lifted from the stock pot and held above the pot while water drains from the pasta. Hence, there is no simple means to prevent fine pasta from escaping from a stock pot strainer during preparation, nor is there a means of suspending a strainer above the stock pot in a manner that provides hands-free straining.

Additionally, the handles on known pasta baskets do not allow for easy grasping when the basket is almost entirely submerged in boiling water, nor do they provide for easy manipulation of the basket with one hand. Furthermore, pasta baskets used with pasta cookers are not easily interchanged with strainers used with stock pots and visa-versa.

Therefore, a need exists for a pasta basket that provides for hanging the basket on the side of a stock pot while the pasta drains, that has a flat bottom to allow the flexibility of resting on the floor of a commercial pasta cooker basin as well as being used with a stock pot, that has holes small enough to prevent fine pasta from escaping, and that has an ergonomic handle for ease of use.

Various devices have been proposed for cooking pasta. U.S. Des. Pat. No. 296,643 to Mueller shows a cooking basket which appears capable of holding large-sized pasta during preparation, but appears unable to prevent fine pasta, such as angel hair pasta, from escaping during preparation. Additionally, the cooking basket is not adapted for being secured on a stockpot while pasta within is being strained, nor does it incorporate an ergonomic handle.

U.S. Pat. No. 6,055,901 to Gantos et al. shows a typical stockpot and strainer combination. The strainer has a set of handles extending outward from opposite sides of its rim that allow the strainer to be placed in and removed from the stockpot. The strainer also has circular perforations around its side which allow water or other cooking fluid to be drained from the strainer. However, as with most stockpot and strainer combinations, the strainer does not provide for hands-free straining, and its circular perforations are not well suited for holding fine pasta, such as angel hair pasta. Further, its handles do not facilitate manipulation of the strainer with one hand.

U.S. Pat. No. 5,957,038 to Shimazaki teaches a cooking pot with a reversible top that functions as either a strainer or a steamer. The top is concave and perforated, and has a diameter that approximates that of the cooking pot. However, the top cannot be used with either a commercial pasta cooker or pots of different sizes. Further, the top does not facilitate hands free straining of food boiled in the pot, and is not suited for preparing angel hair pasta.

U.S. Pat. No. 5,913,966 to Arnone et al. teaches a steamer pan incorporating a single U-shaped bracket that allows the device to be hung on the side of a stockpot. However, if used to submerge food in boiling water within a stockpot, the device does not allow for hands free straining. If submerged in water when hung on the side of a stockpot, the device must then be held above the pot when straining. Additionally, the device is not suited for use with a commercial pasta cooker or for preparing angel hair pasta.

U.S. Pat. No. 6,176,175 to Moreth teaches a fry basket with a disposable mesh liner. The device provides for securing a disposable mesh liner to its inside walls and is suitable for use with a deep fryer. Although the device would prevent fine pasta from escaping, it is not suitable for use with stockpots and does not provide for hands-free straining. Furthermore, if used for preparing pasta, the disposable mesh liner would need to be removed and replaced periodically.

Consequently, none of the above inventions and patents, taken either singly or in combination, is seen to describe the instant invention as claimed and, therefore, an angel hair pasta basket solving the aforementioned problems is desired.

SUMMARY OF THE INVENTION

The angel hair pasta basket is a cooking apparatus designed specifically for the preparation of angel hair pasta. The device can be used in either a commercial or home setting.

The basket is a cylindrical mesh basket with a flat bottom, an ergonomic handle and three retaining clips extending downward from the outside surface of the mesh basket. The mesh is of a grid size that prevents fine pasta from escaping from the basket. The flat bottom allows the basket to rest on the floor of a commercial pasta cooker basin. The handle is ergonomic and is attached at an angle such that it is easy to grasp, even when the basket is almost entirely submerged within a pasta cooker basin. The retaining clips allow the basket to be suspended from the side of a stockpot or the rim of a commercial pasta cooker and, thus, allow for hands-free straining.

Accordingly, it is a principal object of the invention to provide a cooking utensil for preparing angel hair pasta that prevents the pasta from escaping from the utensil by using a very fine mesh.

It is another object of the invention to provide a pasta basket with clips that allow the user to strain boiled pasta without requiring the user to physically hold the basket over a pot or pasta cooker.

It is a further object of the invention to provide a pasta basket that can be used with either a commercial pasta cooker or an ordinary stockpot.

Still another object of the invention is to provide a pasta basket with an ergonomic handle that allows the user to grasp the handle even when the basket is almost entirely submerged in boiling water, and that also provides a thumb stop that allows its user to easily manipulate the basket with one hand.

Yet another object of the invention is to avoid pasta cooker water changes due to escaped pasta, thereby minimizing the expenses associated with down-time while draining and refilling a pasta cooker and the expenses associated with reheating fresh water in a pasta cooker.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
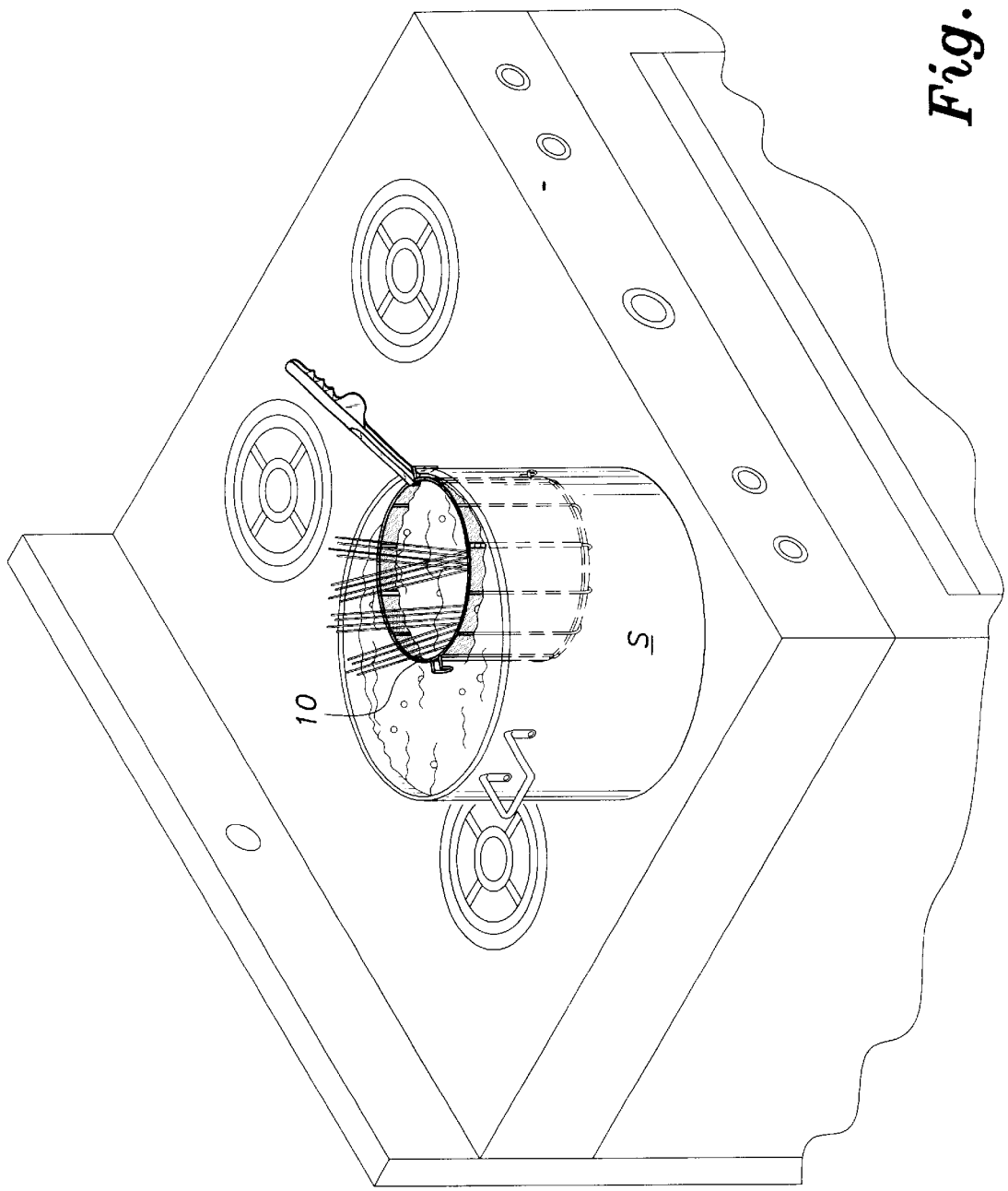
FIG. 1 is an environmental, perspective view of an angel hair pasta basket according to the present invention as used with a stockpot.

The present invention is an angel hair pasta basket, designated generally as 10 in the drawings. The basket 10 is used to prepare fine pasta in either a commercial or home setting, and allows for hands-free straining during preparation of the pasta.

Figure 3:
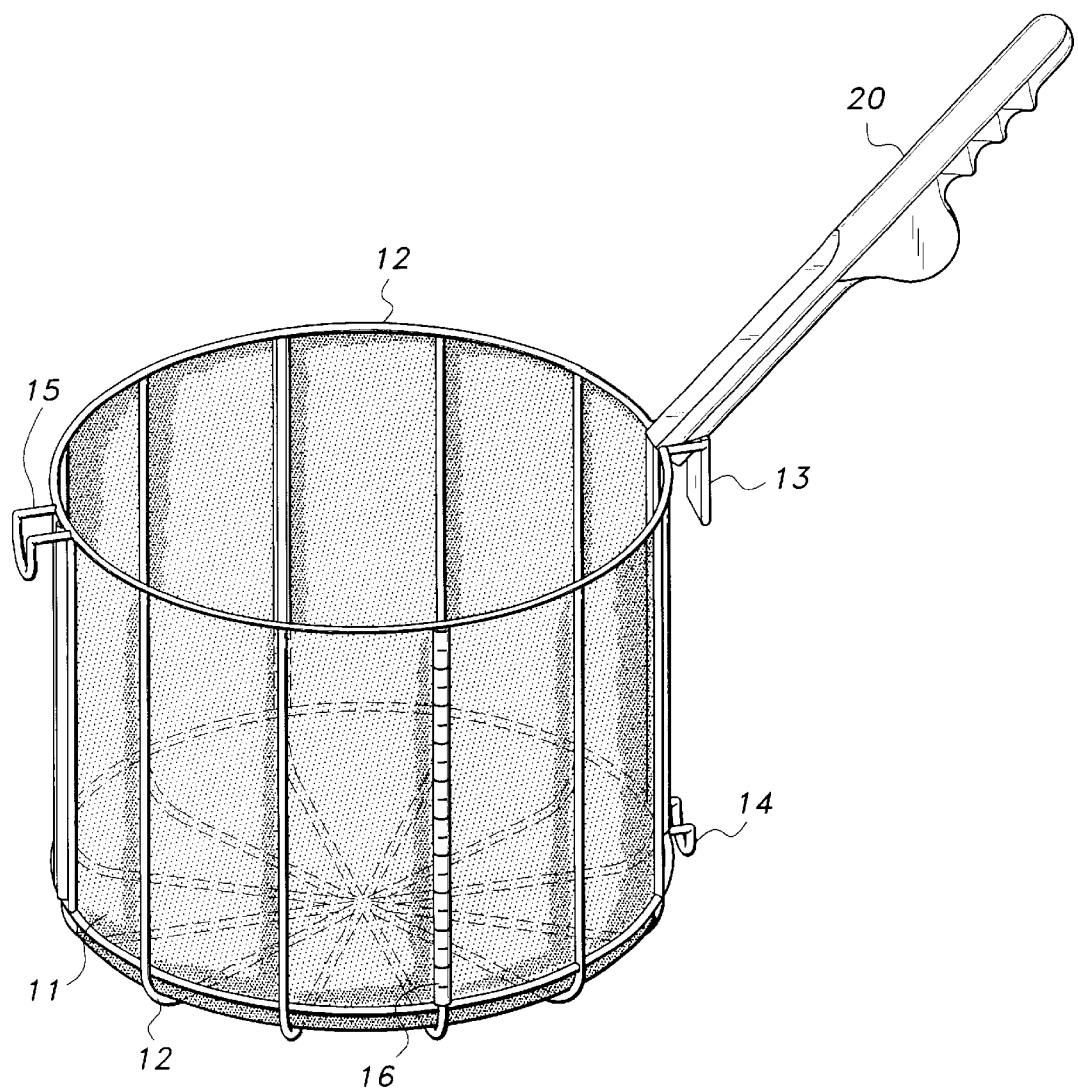
FIG. 3 is an environmental, perspective view of an angel hair pasta basket according to the present invention.

Referring to FIG. 3, the pasta basket is a cylindrical mesh basket 11 formed on a wire frame 12, having an ergonomic handle 20 and three retaining clips 13, 14 and 15 that extend outward and downward from the wire frame 12. The wire frame 12 is defined by a circular wire top rim and a parallel circular wire base, the bottom being defined by a plurality of spokes extending radially from a central disk and bending at an angle of about 90° around the circular base, the free ends extending upward and being joined to the circular top rim.

Figures 5, 6:
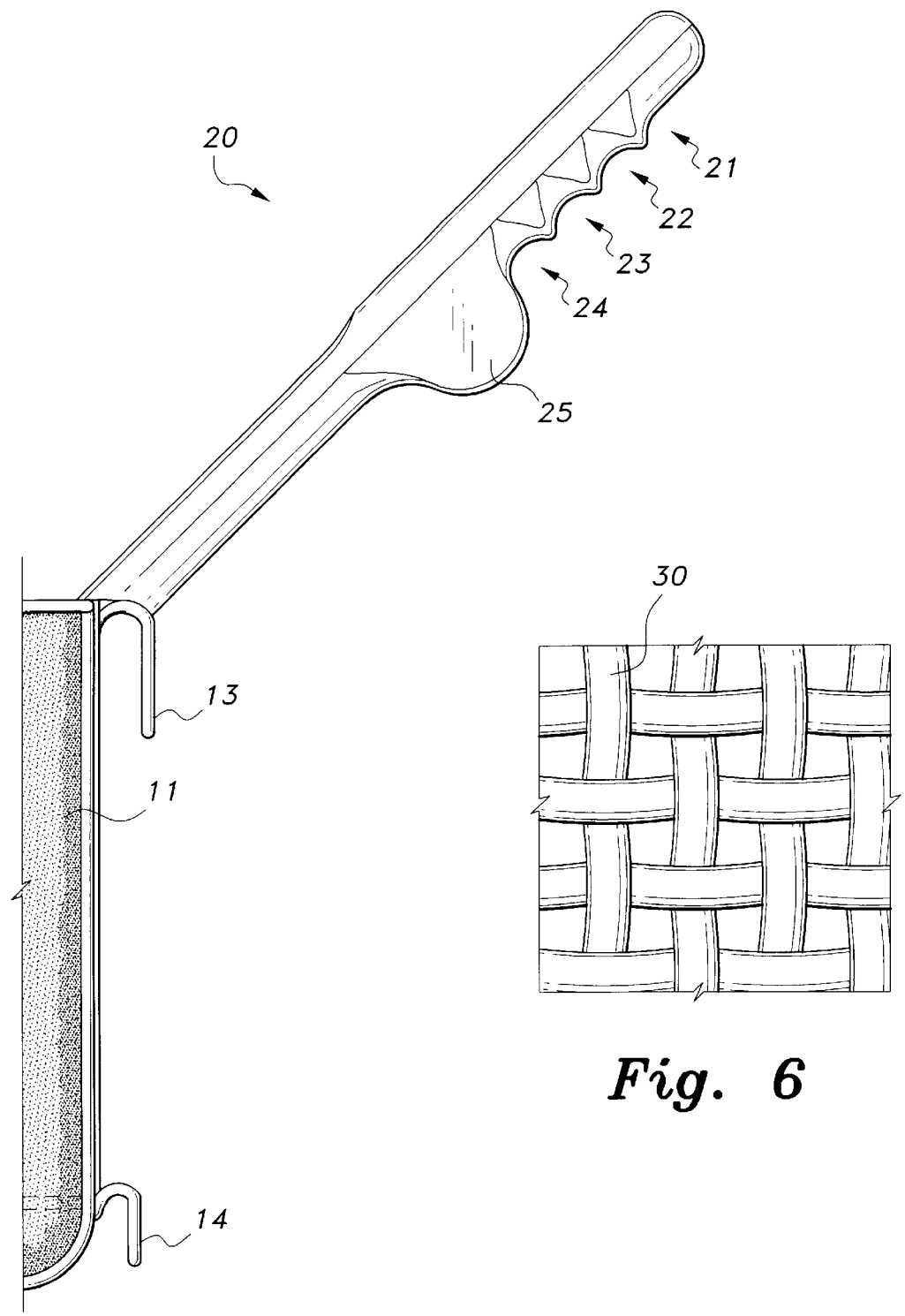
FIG. 5 is a fragmented side view showing the handle for an angel hair pasta basket according to the present invention.
FIG. 6 is a fragmented detail view showing the mesh for an angle hair pasta basket according to the present invention.

Referring to FIG. 6, the mesh 30 forming the basket 11 is fine mesh of a grid size that is small enough to prevent fine pasta from escaping. Thus, the openings in the mesh 30 are less than about one sixteenth of an inch (mesh number 10 or greater).

Figure 2:
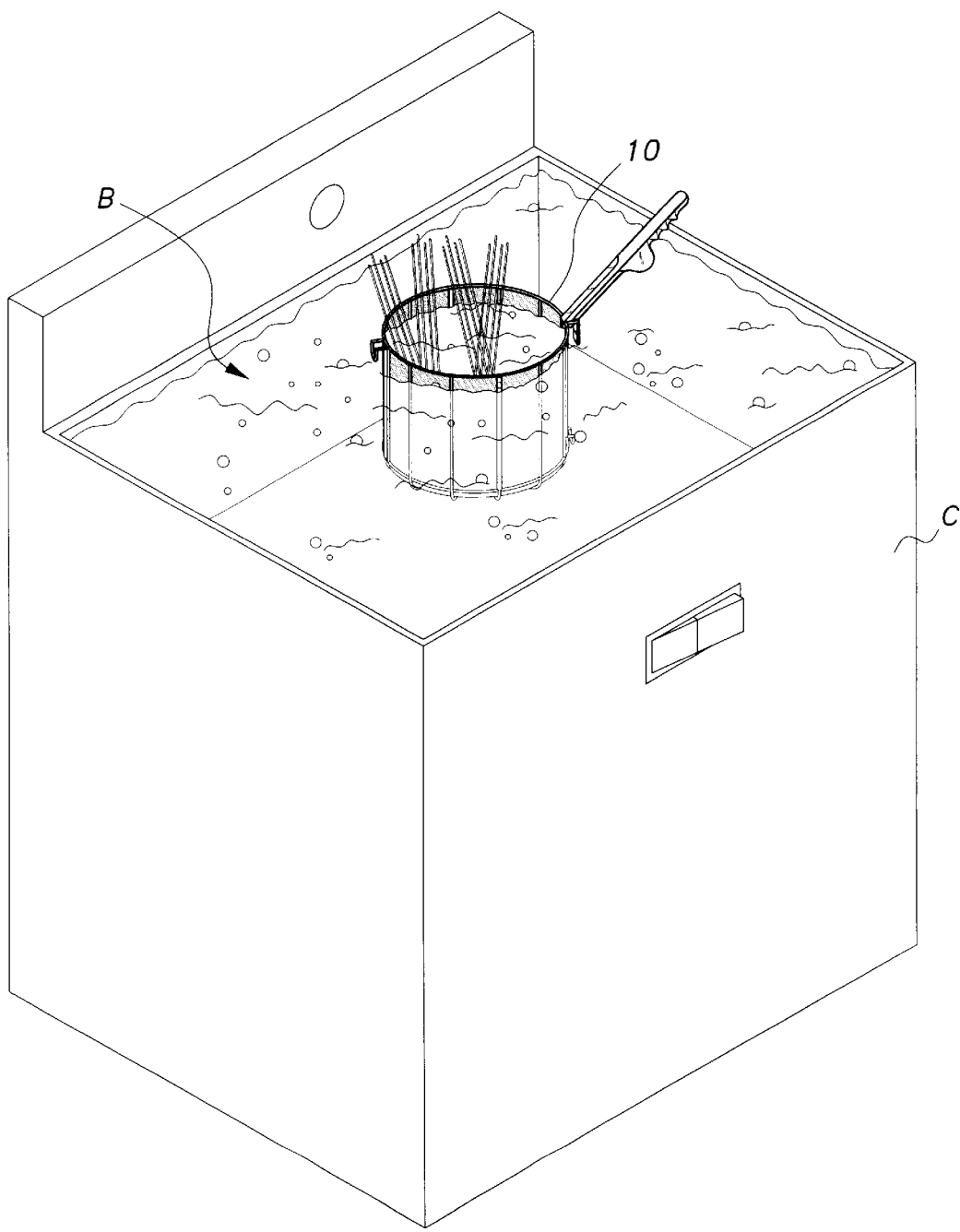
FIG. 2 is an environmental, perspective view of an angel hair pasta basket according to the present invention as used with a commercial pasta cooker.

The bottom of the basket 11 is flat to allow the basket 11 to rest on the floor of a commercial pasta cooker basin B, as shown in FIG. 2, and to thereby allow the basket 11 to be used in this manner with a commercial pasta cooker C, rather than the customary manner in which the basket is hung on either the front or back rim of the pasta cooker basin B.

Referring to FIGS. 3 and 5, the handle 20 is ergonomic and is attached to the basket 11, via the wire frame 12, at an angle such that it is easy to grasp, even when the device 10 is almost entirely submerged within a pasta cooker basin B. Preferably the handle 20 extends upward from the top rim at an angle greater than about 30°. The handle 20 incorporates four finger grooves 21, 22, 23 and 24 and a thumb rest 25, all of which allow a user to easily manipulate the pasta basket 10 with a single hand. The finger grooves 21, 22, 23 and 24 and the thumb rest 25 are located on the underside of the handle's distal end. The thumb rest 25 is formed as a downward and rearward extending curved projection, extending downward from the underside of the handle 20 to a substantially greater depth (e.g., at least double) than the projections forming the finger grooves 21, 22, 23, and 24.

Figure 4:
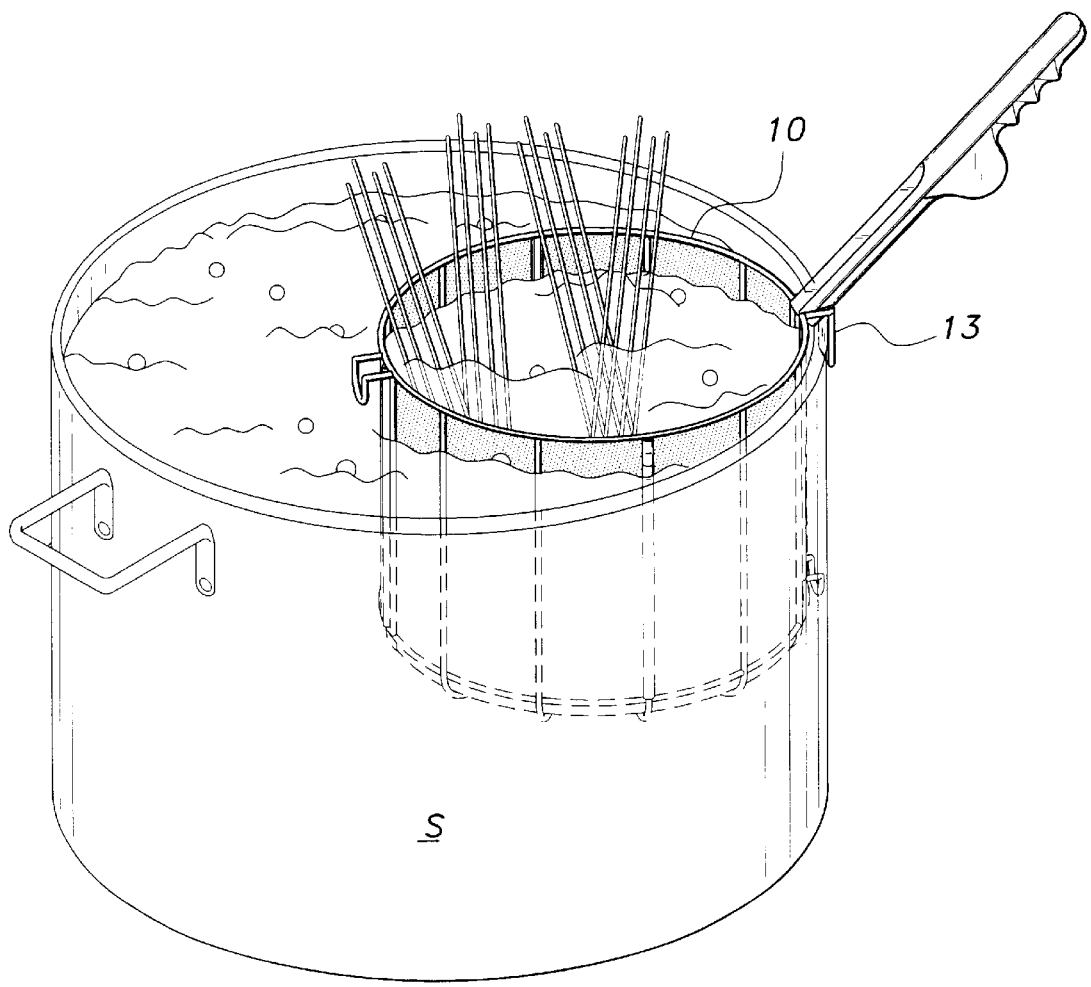
FIG. 4 is a perspective view of an angel hair pasta basket according to the present invention as used with a stockpot.

The retaining clips 13, 14 and 15 allow the device 10 to be suspended from the side of a stock pot S, as shown in FIG. 4, or the rim of a commercial pasta cooker C and, thus, allow for hands-free straining. As shown in FIG. 3, clips 13 and 15 are attached to the rim of the basket 11, so that one or both of the clips 13 and 15 can be placed over the rim of a stockpot in order to immerse the basket in the stockpot S during cooking. It will be noted that clip 13 is joined to the top rim of the wire frame 12 at or below the junction of the handle 20 with the top rim, and that clip 15 is attached to the rim diametrically opposite to clip 13. The clip 14 is attached to the radially extending spokes forming the frame 12 proximate to the flat bottom of the pot and below clip 13, so that when the clip 14 is placed over the rim of the stock pot S, basket 11 is supported above the stock pot S in order to permit the water to strain from the pasta basket 10 into the stock pot S. When suspended over a stockpot S, the pasta basket 10 allows water to drain from pasta without necessitating a user to physically hold the pasta basket 10. It is understood that the retaining clips 13, 14 and 15 can be wider, narrower, longer or short than those shown in the drawings.

Additionally, the pasta basket 10 includes a series of graduated markings 16 on each side of the basket 11. The markings 16 are vertically arranged on a portion of the wire frame 12 and indicate the volume of food contained within the basket 11.

It is to be understood that the present invention is not limited to the embodiment described above, but encompasses any and all embodiments within the scope of the following claims.

I claim:

1. An angel hair pasta basket, comprising:
   a cylindrical wire frame having a circular top rim and a circular, flat base;
   a mesh extending across the flat base and between the base and the top rim, the mesh being a fine mesh sized and dimensioned for preventing angel hair pasta from sliding through the mesh;
   an elongated handle extending from the top rim; and
   at least one clip attached to the top rim adapted for attaching the pasta basket to a rim of a cooking container with the mesh immersed in the container; and
   at least one clip adjacent the base adapted for attaching the pasta basket to the rim of the cooking container with the mesh suspended above the container in order to strain pasta contained in the mesh;
   whereby the angel hair pasta basket is capable of being suspended, at different heights, from the rim of a cooking container and is capable of resting on a floor of cooking container unsupported by clips.

2. The angel hair pasta basket according to claim 1, wherein said mesh defines openings of less than about one sixteen of an inch in width.

3. The angel hair pasta basket according to claim 1, wherein said mesh is at least mesh size 10.

4. The angel hair pasta basket according to claim 1, wherein said handle extends upward from the top rim at an angle of greater than about 30°.

5. The angel hair pasta basket according to claim 1, wherein said handle has a plurality of projections defining finger grooves in said handle.

6. The angel hair pasta basket according to claim 5, wherein said handle further comprises a thumb rest, the thumb rest being a downward and rearward extending curved projection having a depth about two times greater than the depth of the finger grooves.

7. The angel hair pasta basket according to claim 1, further comprising indicia disposed on said wire frame representing a graduated scale corresponding to a volume of the pasta basket at selected depths.

8. The angel hair pasta basket according to claim 1, wherein said at least one clip attached to the top rim comprises a first clip attached to the top rim below said handle.

9. The angel hair pasta basket according to claim 8, wherein said at least one clip attached to the top rim further comprises a second clip attached to the top rim diametrically opposite said first clip.

* * * * *